United States Patent
Seo et al.

(10) Patent No.: US 9,294,934 B2
(45) Date of Patent: Mar. 22, 2016

(54) METHOD AND DEVICE FOR MONITORING CONTROL CHANNEL IN A WIRELESS COMMUNICATION SYSTEM

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 397 days.

(21) Appl. No.: 13/516,066

(22) PCT Filed: Dec. 15, 2010

(86) PCT No.: PCT/KR2010/008965
§ 371 (c)(1),
(2), (4) Date: Jun. 14, 2012

(87) PCT Pub. No.: WO2011/074868
PCT Pub. Date: Jun. 23, 2011

(65) Prior Publication Data
US 2012/0294248 A1    Nov. 22, 2012

Related U.S. Application Data

(60) Provisional application No. 61/286,378, filed on Dec. 15, 2009.

(51) Int. Cl.
*H04W 24/00*   (2009.01)
*H04W 48/16*   (2009.01)

(52) U.S. Cl.
CPC .............. *H04W 24/00* (2013.01); *H04W 48/16* (2013.01)

(58) Field of Classification Search
CPC ............................. H04W 24/00; H04W 48/16
USPC ......................................... 370/328, 329, 330
See application file for complete search history.

(56) References Cited

U.S. PATENT DOCUMENTS

| | | | |
|---|---|---|---|
| 2009/0088148 A1 | 4/2009 | Chung et al. | |
| 2009/0161618 A1* | 6/2009 | Johansson et al. | 370/329 |

(Continued)

FOREIGN PATENT DOCUMENTS

| | | | |
|---|---|---|---|
| KR | 10-2008-0097112 A | 11/2008 | |
| WO | WO 2008/114977 A1 | 9/2008 | |

OTHER PUBLICATIONS

Alcatel-Lucent et al., "Way Forward on PDCCH for Bandwidth Extension in LTE-A," 3GPP TSG RAN WG1 Meeting #58, R1-093699, Shenzhen, China, Aug. 24-28, 2009, 2 pages.

(Continued)

*Primary Examiner* — Pao Sinkantarakorn
*Assistant Examiner* — Richard Chang
(74) *Attorney, Agent, or Firm* — Birch, Stewart, Kolasch & Birch, LLP

(57) ABSTRACT

Discloses are a method and device for monitoring a control channel in a wireless communication system. A user equipment receives a CFI (control format indicator), indicating a size of a control region within a subframe, via a first downlink control channel and confirms whether or not an extended control region is present in the subframe. If the extended control region is present in the subframe, the user equipment monitors a PDCCH (physical downlink control channel) within the control region and the extended control region.

12 Claims, 13 Drawing Sheets

(56) References Cited

U.S. PATENT DOCUMENTS

2011/0205995 A1* 8/2011 Grovlen .................. 370/329
2011/0274066 A1* 11/2011 Tee et al. ................ 370/329

OTHER PUBLICATIONS

Catt, "Design of Backhaul Control Channel for Type I Relay in LTE-A," 3GPP TSG WG1 meeting #58, R1-093525, Shenzhen, China, Aug. 24-28, 2009, 4 pages.

NEC Group, "Control Structure for Relay Type 1 nodes," TSG-RAN WG1#57Bis, R1-092965, Los Angeles, CA, US, Jun. 29-Jul. 3, 2009, pp. 1-5.

Nokia et al., "Text proposal on backhaul resource assignment," 3GPP TSG RAN WG1 Meeting #57, R1-092249, San Francisco, US, May 4-8, 2009, 1 page.

Samsung, "PDCCH Extension to Support Operation with CI," 3GPP TSG RAN WG1 #59, R1-094569, Jeju, Korea, Nov. 9-13, 2009, 2 pages.

* cited by examiner

FIG. 6
(A)
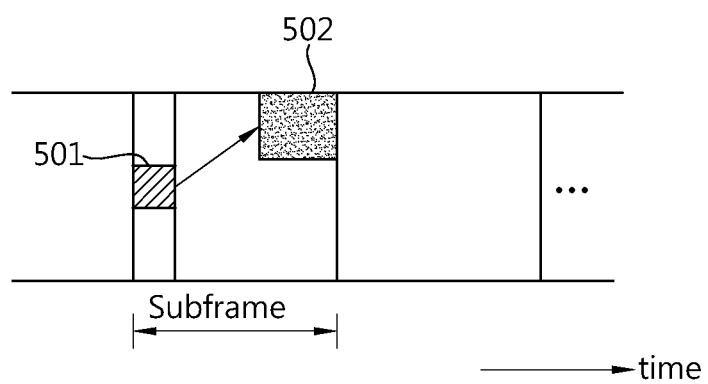
(B)
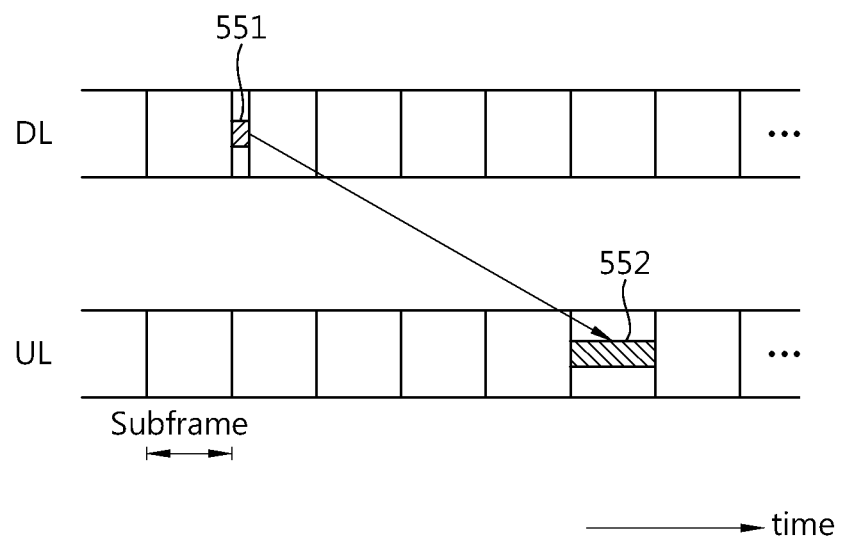

METHOD AND DEVICE FOR MONITORING CONTROL CHANNEL IN A WIRELESS COMMUNICATION SYSTEM

CROSS REFERENCE TO RELATED APPLICATIONS

This application is the National Phase of PCT/KR2010/008965 filed on Dec. 15, 2010, which claims priority under 35 U.S.C. §119(e) to U.S. Provisional Application No. 61/286,378 filed on Dec. 15, 2009, all of which are hereby expressly incorporated by reference into the present application.

TECHNICAL FIELD

The present invention relates to wireless communications, and more particularly, to a method and apparatus for monitoring a control channel in a wireless communication system.

BACKGROUND ART $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas.

In recent years, there is an ongoing discussion on 3GPP LTE-advanced (LTE-A) evolved from the 3GPP LTE. The 3GPP LTE-A ensures backward compatibility with the 3GPP LTE, and supports a wideband by using carrier aggregation.

The 3GPP LTE system supports only one bandwidth (i.e., one component carrier) among {1.4, 3, 5, 10, 15, 20}MHz. In order to support a full bandwidth of 40 MHz, carrier aggregation uses two carriers having a bandwidth of 20 MHz or uses 3 carriers respectively having bandwidths of 20 MHz, 15 MHz, and 5 MHz. One component carrier corresponds to one cell.

The carrier aggregation can support backward compatibility with legacy systems, and can significantly increase a data rate by using a plurality of component carriers.

In a single-carrier system, a control channel and a data channel are designed on the basis of a single component carrier. However, it may be ineffective if the channel structure of the single-carrier system is directly used in the multi-carrier system.

In particular, in 3GPP LTE, the control channel is monitored only in a specific region of a subframe. Since a plurality of component carriers are used due to carrier aggregation, there is an increase in an amount of control information for the plurality of component carriers. Therefore, it may be not enough to transmit all control channels by using only a region for the conventional control channel.

SUMMARY OF INVENTION

Technical Problem

The present invention provides a method and apparatus for monitoring a control channel in a wireless communication system.

Technical Solution

In an aspect, a method for monitoring a control channel in a wireless communication system is provided. The method includes receiving a control format indicator (CFI) indicating a size of a control region in a subframe through a first downlink control channel, determining whether an extended control region is present in the subframe, and if the extended control region is present in the subframe, monitoring a physical downlink control channel (PDCCH) in the control region and the extended control region.

The method may further includes receiving extended control information regarding the extended control region in the subframe through a second downlink control channel in the control region. Whether the extended control region is present is determined based on the extended control information.

The extended control information may include presence information regarding whether the extended control region is present.

The extended control information may include resource allocation information regarding a resource to which the extended control region is allocated.

The extended control information may include a cross-CFI indicating a size of a control region in a subframe of another component carrier.

If the CFI indicates a specific value, the extended control information may be received.

If the CFI indicates a maximum size of the control region, the extended control information may be received.

In another aspect, a user equipment configured for monitoring a control channel in a wireless communication system is provided. The user equipment includes a radio frequency (RF) unit configured for transmitting and receiving a radio signal, and a processor coupled to the RF unit, wherein the processor is configured for receiving a control format indicator (CFI) indicating a size of a control region in a subframe through a first downlink control channel, determining whether an extended control region is present in the subframe, and if the extended control region is present in the subframe, monitoring a physical downlink control channel (PDCCH) in the control region and the extended control region.

Advantageous Effects

An additional control region can be defined to transmit a large amount of control information. Backward compatibility with a legacy system is guaranteed, and an overhead of a user equipment for detecting a control channel can be prevented from increasing.

DESCRIPTION OF DRAWINGS

FIG. 6 shows resource allocation in 3GPP LTE.

MODE FOR INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Each BS provides a communication service to a specific geographical region (generally referred to as a cell). The cell can be divided into a plurality of regions (referred to as sectors).

Figure 1:
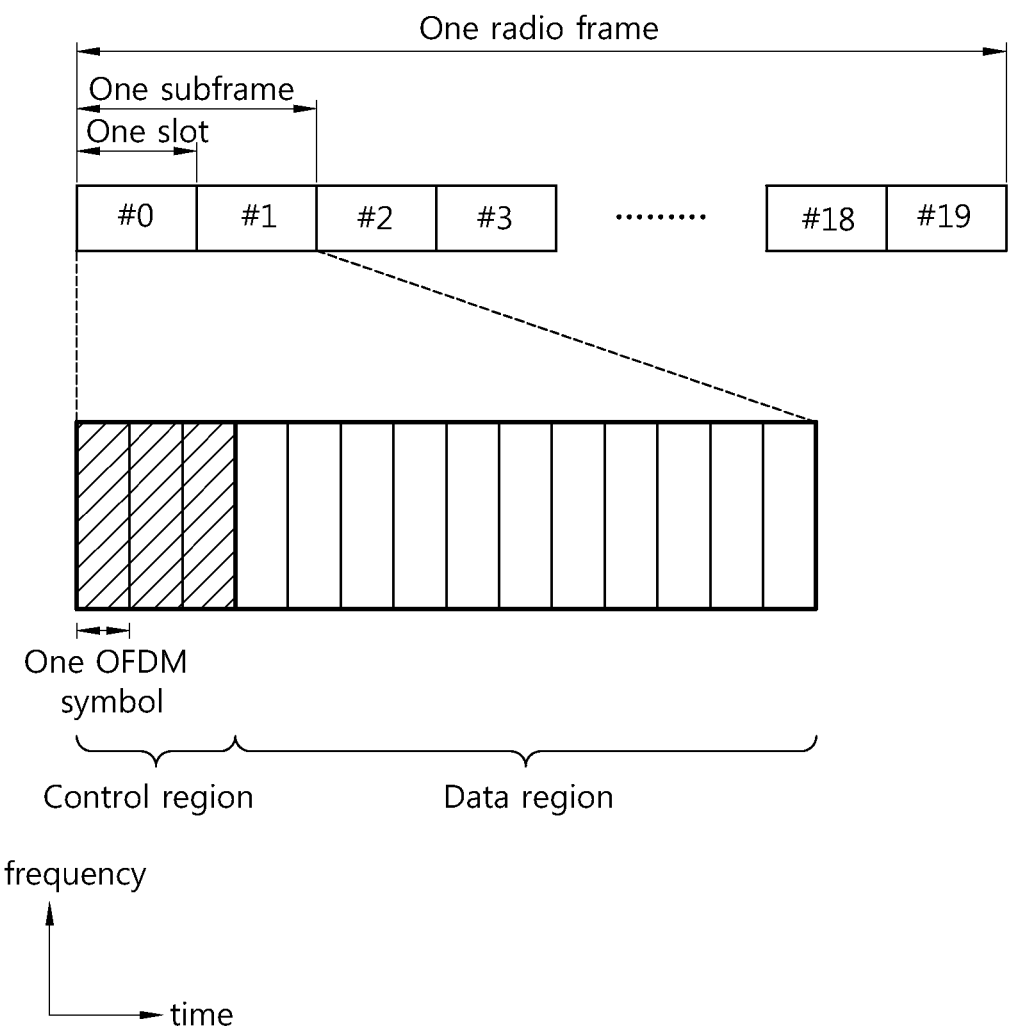
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 6 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame consists of 20 subframes indexed with 0 to 19. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to three preceding OFDM symbols of a $1^{st}$ slot in the subframe. The number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH) and a physical hybrid-ARQ indicator channel (PHICH), and a physical uplink control channel (PUCCH).

The PCFICH transmitted in a $1^{st}$ OFDM symbol in the subframe carries a control format indicator (CFI) regarding the number of OFDM symbols (i.e., a size of the control region) used for transmission of control channels in the subframe. The UE first receives the CFI through the PCFICH, and thereafter monitors the PDCCH.

Unlike the PDCCH, the PCFICH is transmitted through a fixed PCFICH resource of the subframe, without using blind decoding.

The PHICH carries a positive acknowledgement (ACK)/negative-acknowledgement (NACK) signal for uplink hybrid automatic repeat request (HARQ). The ACK/NACK signal for uplink (UL) data on the PUSCH transmitted by the UE is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between a UE and a BS. The system information transmitted through the PBCH is referred to as a master information block (MIB). In comparison thereto, system information transmitted through the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

Figure 2:
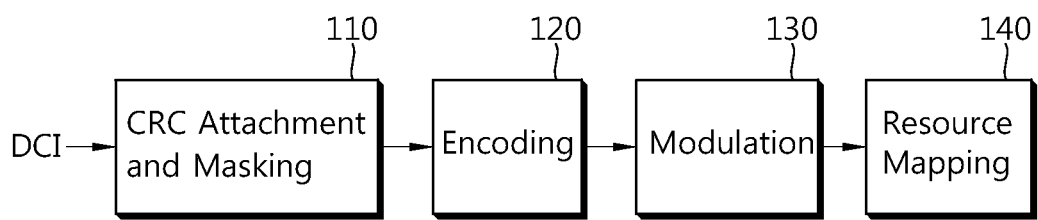
FIG. 2 shows a physical downlink control channel (PDCCH) configuration.

FIG. 2 shows a PDCCH configuration. A BS determines a PDCCH format according to DCI to be transmitted to a UE, attaches a cyclic redundancy check (CRC) to control information, and masks a unique identifier (referred to as a radio network temporary identifier (RNTI)) to the CRC according to an owner or usage of the PDCCH (step 110).

If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

When the C-RNTI is used, the PDCCH carries control information for a specific UE (such information is called UE-specific control information), and when other RNTIs are used, the PDCCH carries common control information received by all or a plurality of UEs in a cell.

The CRC-attached DCI is encoded to generate coded data (step 120). Encoding includes channel encoding and rate matching.

The coded data is modulated to generate modulation symbols (step 130).

The modulation symbols are mapped to physical resource elements (REs) (step 140). The modulation symbols are respectively mapped to the REs.

Figure 3:
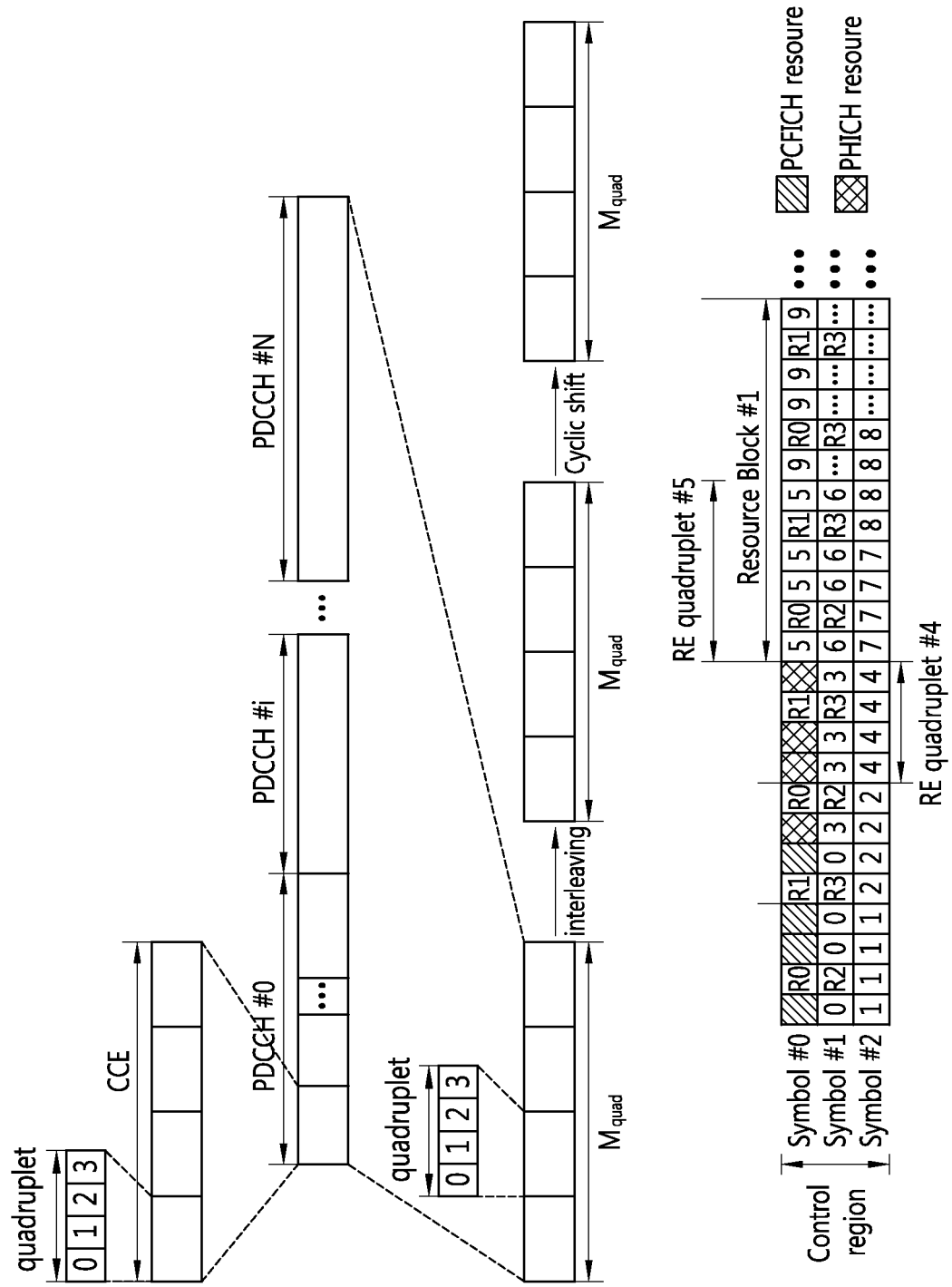
FIG. 3 shows exemplary resource mapping of a PDCCH.

FIG. 3 shows exemplary resource mapping of a PDCCH. The section 6 of 3GPP TS 36.211 V8.7.0 may be incorporated herein by reference. R0 denotes a reference signal of a 1$^{st}$ antenna. R1 denotes a reference signal of a 2$^{nd}$ antenna. R2 denotes a reference signal of a 3$^{rd}$ antenna. R3 denotes a reference signal of a 4$^{th}$ antenna.

A control region in a subframe includes a plurality of control channel elements (CCEs). The CCE is a logical allocation unit used to provide the PDCCH with a coding rate depending on a radio channel state, and corresponds to a plurality of resource element groups (REGs). According to an association relation of the number of CCEs and the coding rate provided by the CCEs, a PDCCH format and a possible number of bits of the PDCCH are determined.

One REG (indicated by a quadruplet in the drawing) includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

A control channel consisting of one or more CCEs performs interleaving in an REG unit, and is mapped to a physical resource after performing cyclic shift based on a cell identifier (ID).

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking.

A plurality of PDCCHs can be transmitted in one subframe. A UE monitors a plurality of PDCCHs in every subframe. Monitoring is an operation of attempting PDCCH decoding by the UE according to a format of the monitored PDCCH.

The 3GPP LTE uses a search space to reduce an overhead caused by blind decoding. The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. The UE-specific search space supports a PDCCH having a CCE aggregation level of {1, 2, 4, 8}.

The following terminologies are defined.

A resource element (RE) is a minimum frequency-time unit by which a modulation symbol of a data channel or a modulation symbol of a control channel is mapped. If there are M subcarriers on one OFDM symbol and if one slot includes N OFDM symbols, then one slot includes M×N REs.

A physical resource block (PRB) is a unit frequency-time resource for transmitting data. One PRB consists of a plurality of REs contiguous in a frequency-time domain, and a plurality of PRBs are defined in one subframe.

A virtual resource block (VRB) is a virtual unit resource for transmission of the data channel or the control channel. The number of REs included in one VRB is equal to the number of REs included in one PRB. For transmission of the data channel or the control channel, one VRB can be mapped to the PRB or one VRB can be mapped to a plurality of PRBs.

A localized virtual resource block (LVRB) is one type of the VRB. One LVRB is mapped to one PRB, and there is no overlapping of PRBs to which different LVRBs are mapped. The LVRB can be interpreted directly as the PRB.

A distributed virtual resource block (DVRB) is another type of the VRB. One DVRB is mapped to some REs in a plurality of PRBs, and there is no overlapping of REs which are mapped to different DVRBs.

Figure 4:
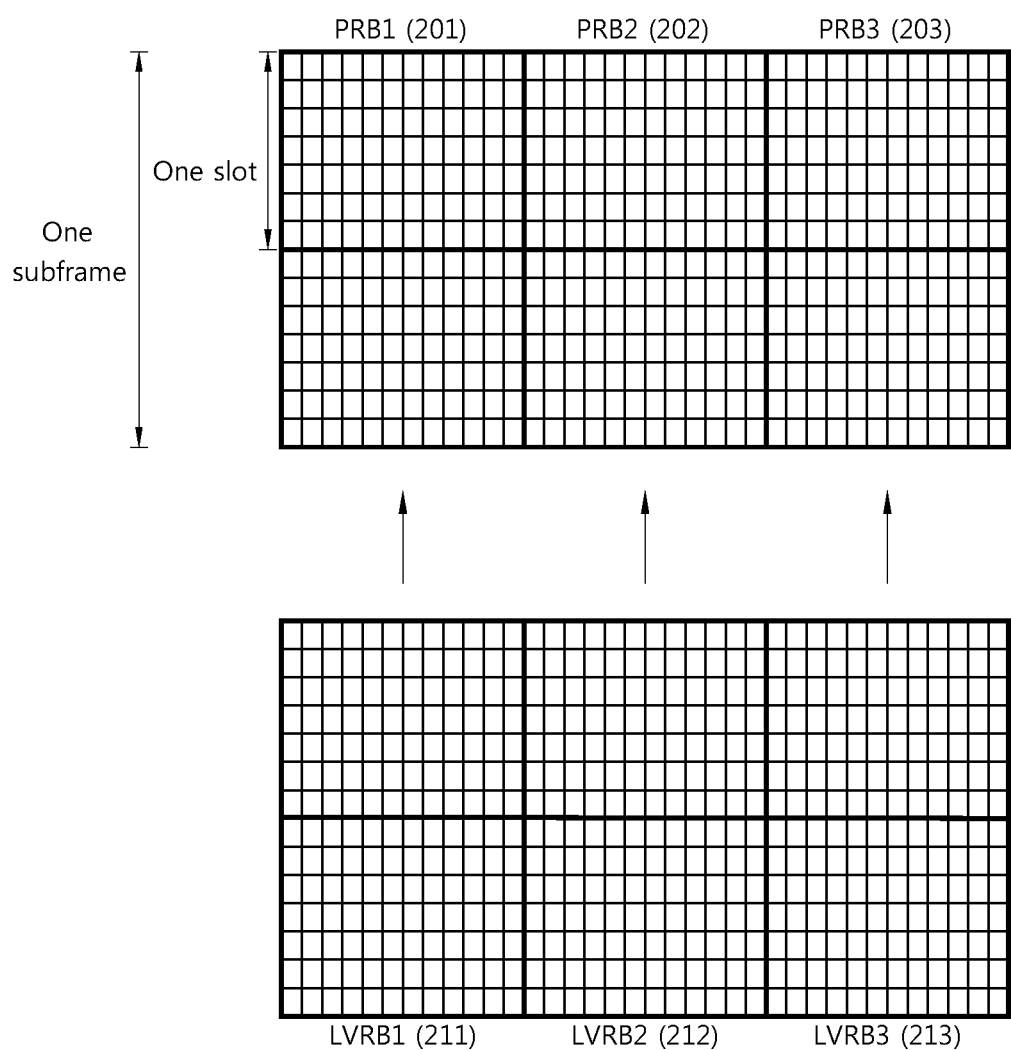
FIG. 4 shows localized virtual resource block (LVRB)-physical resource block (PRB) mapping in 3GPP LTE.

FIG. 4 shows LVRB-PRB mapping in 3GPP LTE. Although it is shown herein that both of an LVRB and a PRB include 12 subcarriers in one slot and one slot includes 6 OFDM symbols, the number of OFDM symbols included in one slot and the number of subcarriers included therein are for exemplary purposes only.

An LVRB1 211 is mapped to a PRB1 201. An LVRB2 212 is mapped to a PRB2 202. An LVRB3 213 is mapped to a PRB3 203. The LVRB is one-to-one mapped to the PRB. An LVRB having an index i corresponds to a PRB having an index j. According to a VRB allocation scheme, i and j may be equal to or different from each other.

Figure 5:
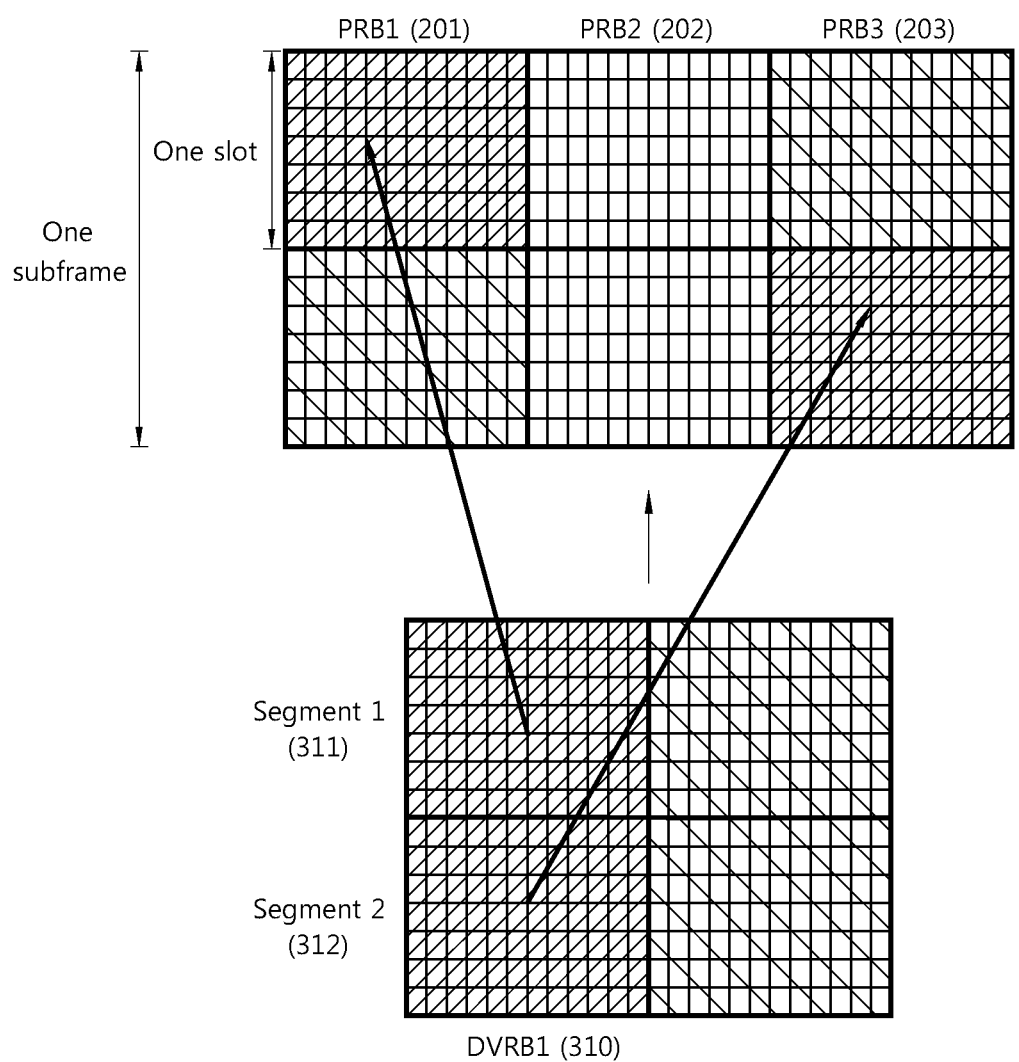
FIG. 5 shows distributed virtual resource block (DVRB)-PRB mapping in 3GPP LTE.

FIG. 5 shows DVRB-PRB mapping in 3GPP LTE. A DVRB is divided into $N_D$ segments in a frequency domain. Each segment is mapped to a plurality of PRBs.

Herein, $N_D$=2. A DVRB1 310 is divided into a segment1 311 and a segment2 312. The two segments are respectively mapped to a PRB1 301 and a PRB3 303.

FIG. 6 shows resource allocation in 3GPP LTE. FIG. 6A shows a DL resource allocation, and FIG. 6B shows a UL resource allocation.

To receive a DL transport block, a UE monitors a PDCCH, and receives a DL grant through a PDCCH 501. The DL grant includes a VRB allocation for a PDSCH 502. The UE receives the DL transport block through the PDSCH 502 indicated by the DL grant. The UE acquires a VRB mapped to a PRB, in which the PDSCH 502 is transmitted, on the basis of the VRB allocation and thus receives the DL transport block.

To receive a UL transport block, the UE monitors the PDCCH in a DL subframe and receives the UL resource allocation through a PDCCH 551. The DL resource allocation includes a VRB allocation for a PUSCH 552. The UE transmits the UL transport block through the PUSCH 552 configured based on the UL resource allocation. The UE maps the VRB allocated based on the VRB allocation to a PRB, and transmits the PUSCH 552 by using the mapped PRB.

As described above, by receiving the VRB allocation through the PDCCH from the BS, the UE can determine a PRB for receiving the DL transport block or for transmitting the UL transport block. In this case, it is assumed that the VRB allocation consists of a typical bitmap. If there are $N_{RB}$ VRBs, $N_{RB}$ bits are required for the bitmap. This may result in a problem in that a size of a payload of DCI transmitted through the PDCCH is increased in proportion to the number of VRBs.

Therefore, to decrease an overhead of the VRB allocation, as disclosed in the section 7.1.6 of 3GPP TS 36.213 V8.7.0 (2009-05), the VRB allocation is classified into a type 0, a type 1, and a type 2, and a resource block group (RBG) and a subset are introduced.

Now, a multiple-carrier system is described.

To support a higher data rate, a multiple-carrier system supporting a plurality of component carriers (CCs) is taken into account.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems. For example, if 5 CCs are assigned as a granularity of a carrier unit having a bandwidth of 20 MHz, a bandwidth of up to 100 MHz can be supported.

The CC may correspond to one cell. A UE supporting a plurality of CCs can receive a service from a plurality of cells.

Figure 7:
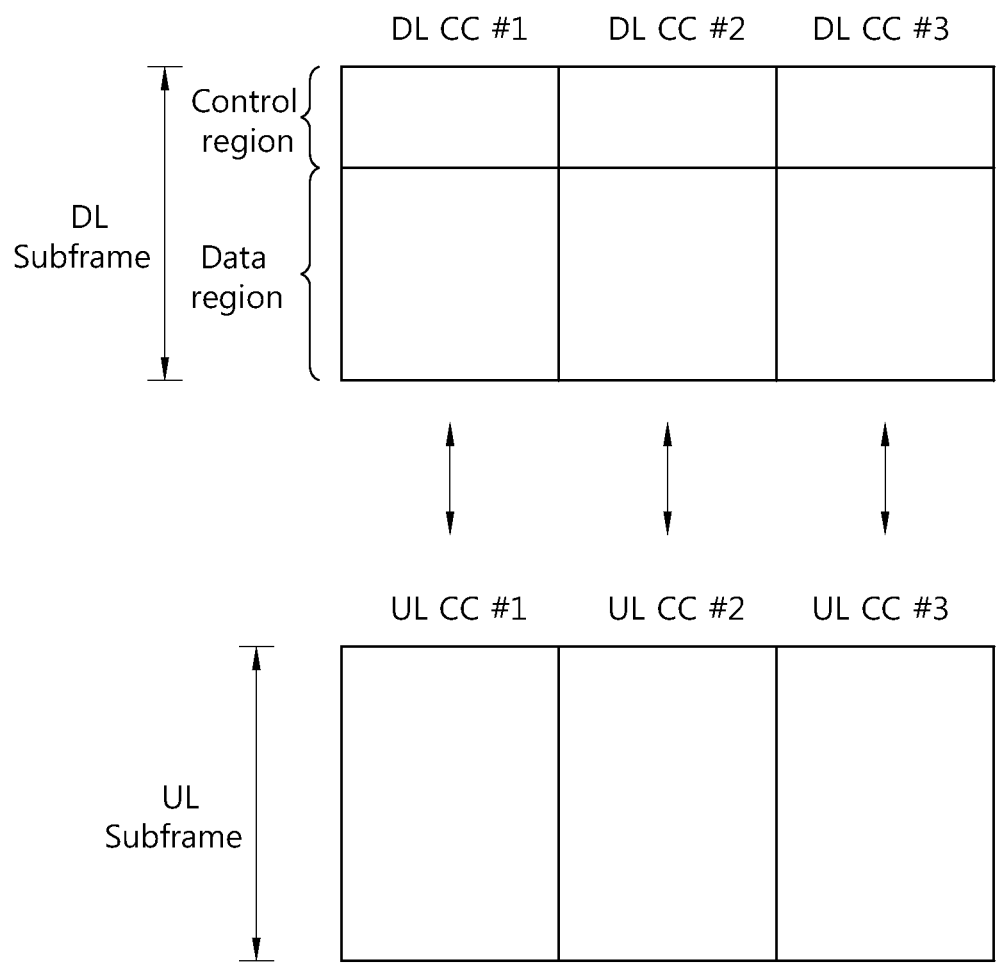
FIG. 7 shows an example of multiple carriers.

FIG. 7 shows an example of multiple carriers. Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC.

In a multi-carrier system, a CC linkage can be defined between a DL CC and a UL CC. The CC linkage implies a mapping relation between a DL CC in which a PDCCH for carrying a UL grant is transmitted and a UL CC scheduled by the UL grant. Alternatively, the CC linkage may be a mapping relation between a DL CC (or UL CC) in which data for HARQ is transmitted or a UL CC (or DL CC) in which an HARQ ACK/NACK signal is transmitted.

The example of FIG. 7 shows a symmetric CC linkage in which a DL CC and a UL CC are one-to-one mapped.

When the CC linkage is defined, two methods are possible as CC scheduling.

In a first method, the CC linkage is fixed. This is called a fixed CC linkage or a static CC linkage. A UL grant is transmitted through the DL CC. A UL transport block is transmitted by using the UL grant through a UL CC linked to the DL CC. Since a UL CC to be scheduled by the UL grant can be determined through a predefined CC linkage, additional signaling is not necessary.

In a second method, the CC linkage is dynamically or semi-statically changed or overridden. For example, a PDCCH and a PDSCH are transmitted in different DL CCs, or a PUSCH is transmitted through a UL CC not linked to a DL CC in which the PDCCH is transmitted. This is called cross-carrier scheduling.

Figure 8:
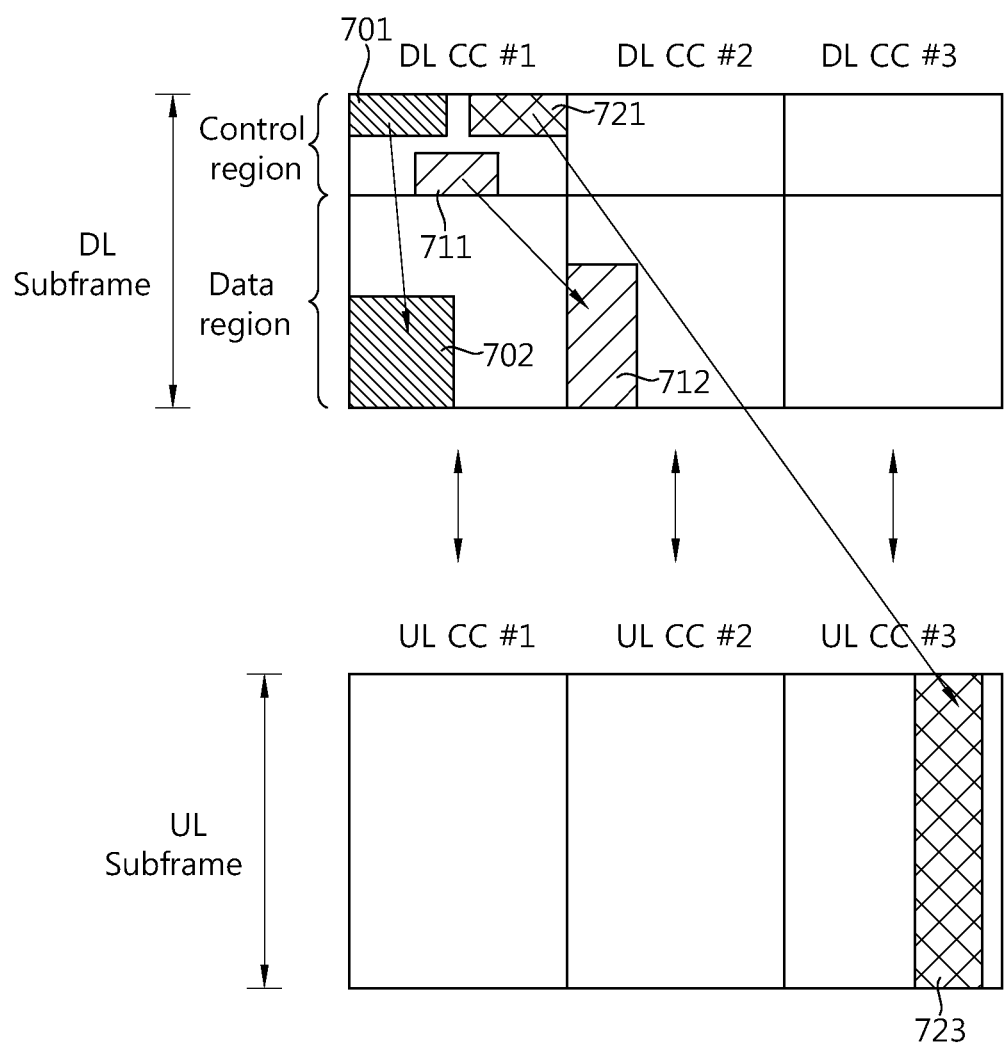
FIG. 8 shows an example of cross-carrier scheduling.

FIG. 8 shows an example of cross-carrier scheduling. It is assumed that a DL CC #1 is linked to a UL CC #1, a DL CC #2 is linked to a UL CC #2, and a DL CC #3 is linked to a UL CC #3.

A $1^{st}$ PDCCH 710 of the DL CC #1 carries DCI for a PDSCH 702 of the same DL CC #1. A $2^{nd}$ PDCCH 711 of the DL CC #1 carries DCI for a PDSCH 712 of the DL CC #2. A $3^{rd}$ PDCCH 721 of the DL CC #1 carries DCI for a PUSCH 722 of the unlinked UL CC #3.

For cross-carrier scheduling, the DCI of the PDCCH may include a carrier indicator field (CIF). The CIF indicates a DL CC or a UL CC scheduled through the DCI. The CIF may include an index of a UL CC or an index of a DL CC scheduled through the DCI. For example, the $2^{nd}$ PDCCH 711 may include a CIF indicating the DL CC #2. The $3^{rd}$ PDCCH 721 may include a CIF indicating the UL CC #3.

A CFI indicated by a CC in which the PDCCH is detected is called a self-CFI. A CFI indicated by a CC different from the CC in which the PDCCH is detected is called a cross-CFI.

In the self-CFI, a CC in which the CFI is obtained (or transmitted) is equal to a CC in which the CFI is used. In the cross-CFI, a CC in which the CFI is obtained (or transmitted) is different from a CC in which the CFI is used. That is, when the UE performs PDCCH monitoring in the DL CC #2, if the CFI is directly obtained from the DL CC #2, it is the self-CFI, and if the CFI is obtained from another CC (i.e., the CC #1 or the CC #3), it is the cross-CFI.

Figure 9:
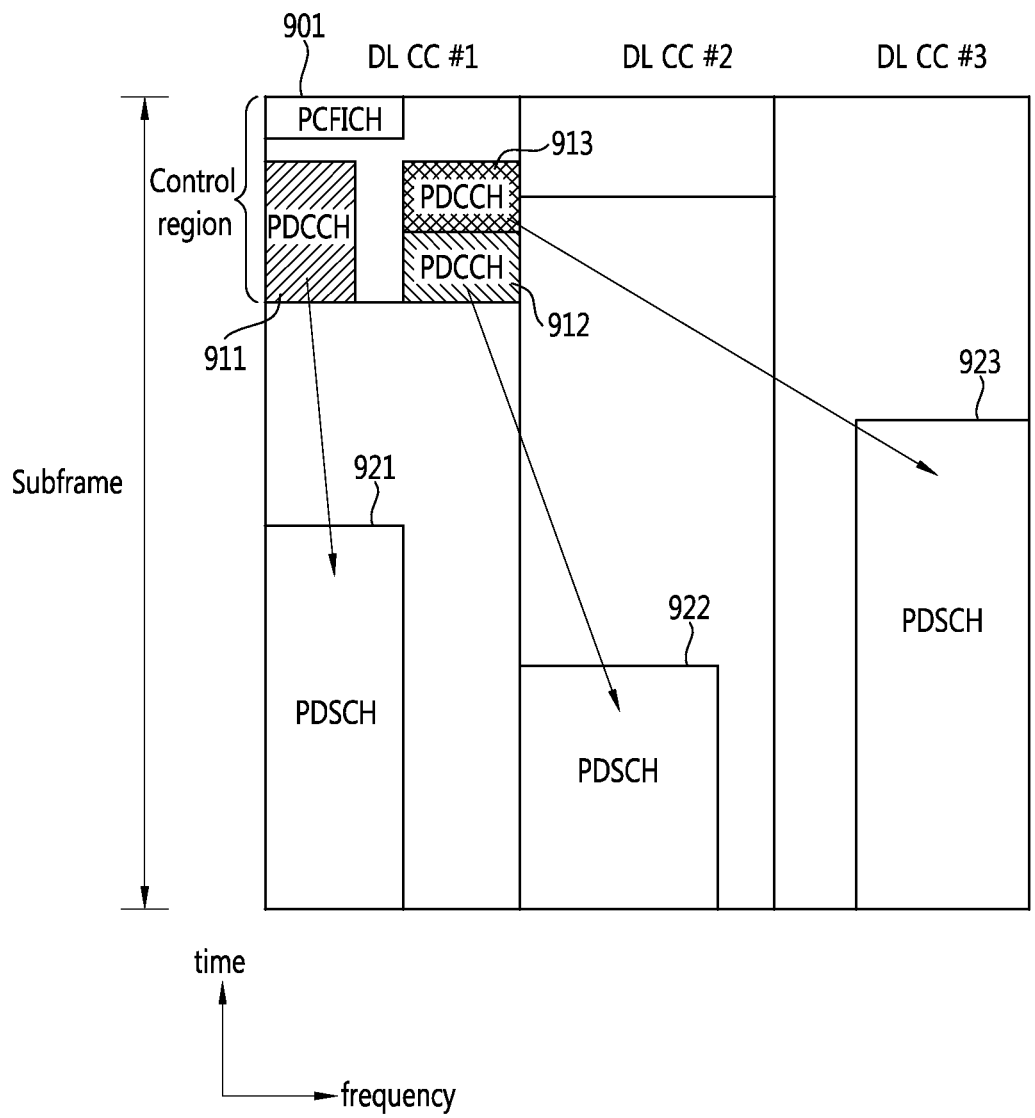
FIG. 9 shows an exemplary operation of a multi-carrier system.

FIG. 9 shows an exemplary operation of a multi-carrier system.

A UE can know a CFI of a DL CC #1 through a PCFICH 901 of the DL CC #1. Therefore, a PDCCH can be monitored in a control region. The UE can receive DL data from a PDSCH 921 of the DL CC #1 through a $1^{st}$ PDCCH 911.

Since cross-carrier scheduling is possible, it is assumed that a $2^{nd}$ PDCCH 912 indicates a PDSCH 922 of a DL CC #2 and a $3^{rd}$ PDCCH 913 indicates a PDSCH 923 of a DL CC #3. It is also assumed that the DL CC #2 is a CC in which its control region is allocated, whereas the DL CC #3 is a PDCCH-less CC in which its control region is not allocated.

With the introduction of the cross-carrier scheduling and the PDCCH-less CC, if control channels for other CCs are scheduled in a specific CC, the existing control channel consisting of up to 3 OFDM symbols may be insufficient. For example, since PDCCHs for the DL CC #2 and the DL CC #3 are transmitted through the DL CC #1, a control region of the DL CC #1 may be insufficient.

Figure 10:
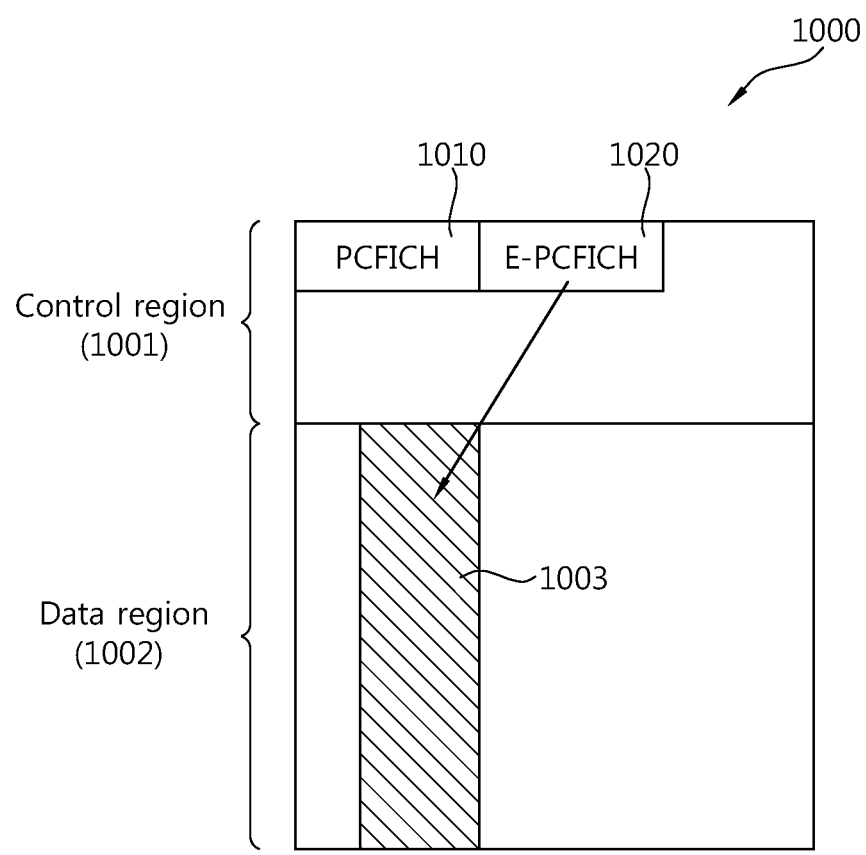
FIG. 10 shows control information transmission according to an embodiment of the present invention.

FIG. 10 shows control information transmission according to an embodiment of the present invention.

A subframe 1000 includes a control region 1001, a data region 1002, and an extended control region 1003. The extended control region 1003 is used to transmit some PDCCHs of the existing data region.

A CFI for reporting a size of the existing control region 1001 is transmitted through a PCFICH 1010. Extended control information regarding the extended control region 1003 is transmitted through an E-PCFICH 1020. Since the CFI is transmitted through the PCFICH 1010, backward compatibility with the existing 3GPP LTE is guaranteed.

The extended control information includes presence information regarding whether the extended control region 1003 is present and/or resource allocation information of the extended control region 1003. In addition, the extended control information may include a cross-CFI.

The presence information regarding whether the extended control region 1003 is present is transmitted through the E-PCFICH 1020, and the extended control region 1003 can use a predetermined resource. Alternatively, the resource allocation information of the extended control region 1003 and the presence information can be transmitted through the E-PCFICH 1020. Whether the extended control region 1003 is present is determined according to the presence of the E-PCFICH 1020, and the resource allocation information of the extended control region 1003 can be transmitted through the E-PCFICH 1020.

Various methods are possible for allocation of the extended control region 1003. The extended control region 1003 can be allocated in an OFDM symbol unit. Alternatively, the extended control region 1003 can be allocated in an RB unit. To obtain sufficient frequency diversity, the extended control region 1003 may follow DVRB allocation of the PDSCH. Alternatively, an RB of a $1^{st}$ slot may follow the DVRB allocation, and an RB of a $2^{nd}$ slot may follow RB allocation on the same frequency as RB allocation of the $1^{st}$ slot.

For transmission of the E-PCFICH 1020, a resource predetermined in the control region 1001 can be used. Therefore, the UE can attempt to detect the E-PCFICH 1020 by searching for the determined resource. A resource region used in the extended control region 1003 follows RB allocation of the PDSCH, has a predetermined start point, and is allocated in a predetermined density unit. For example, allocation always starts from RB=0, and an increment of the RB size is a multiple of 4. Alternatively, the increment can be a unit less than 1, such as a multiple of ½.

A fixed resource such as an RE allocated to the PHICH can be used for transmission of the E-PCFICH 1020.

CCEs of the existing PDCCH are used for transmission of the E-PCFICH 1020, and detection of the E-PCFICH 1020 can be attempted through blind decoding. For detection of the E-PCFICH 1020, an extended identifier can be used in CRC masking. The extended identifier may be UE specific or cell specific. An identifier such as the existing C-RNTI can be reused as the extended identifier. To decrease the number of blind decoding attempts, a search space in which the E-PCFICH 1020 is searched can be limited. It can be limited to a UE-specific search space or a common search space, or a new extended search space can be defined. Alternatively, a start point of the search space of the E-PCFICH 1020 can be fixed. The number of CCE aggregation levels used for detection of the E-PCFICH 1020 can also be limited. A DCI format used in the E-PCFICH 1020 can be predetermined.

Since the extended control region 1003 is used when a resource that can be used for the PDCCH is not enough, the UE can be allowed to attempt to detect the E-PCFICH 1020 only when a size of the control region is maximum (or a value indicated by the CFI is maximum) in a corresponding subframe. In 3GPP LTE, the size of the control region of the subframe is up to 3 OFDM symbols. Therefore, if the CFI indicates 3 OFDM symbols, the UE can attempt to detect the E-PCFICH 1020.

The presence/absence of the E-PCFICH 1020 (or the presence/absence of the extended control region) can be reported by the BS to the UE through a radio resource control (RRC) message or system information. Alternatively, when the BS determines that cross-carrier scheduling is possible through the RRC message or the system information, the UE can know that the E-PCFICH 1020 is present.

When the CFI is set to a specific value, the UE can determine the presence/absence of the extended control region 1003 without an indication by the E-PCFICH 1020. For example, when the CFI indicates a maximum size of the control region, the UE can know that the extended control region 1003 is present. Assume that the extended control region 1003 is set to DVRB 0~3 of the PDSCH when CFI=3. Then, the UE first detects the CFI through the PCFICH 1010, and if CFI=3, can attempt to detect the PDCCH within the extended control region 1003 allocated to the UE by searching for the DVRB 0~3 of the PDSCH. This has an advantage in that additional signaling of the E-PCFICH 1020 is unnecessary to report the presence/absence of the extended control region 1003 and a region to which the extended control region is allocated.

An unmapped REG can be used for transmission of the E-PCFICH 1020. In the 3GPP LTE system, if a reference signal (RS) is present in one OFDM symbol, the number of REs in use is a multiple of 4. The PCFICH uses 4 REGs(=16 REs). The PHICH uses the REGs whose number is a multiple of 3 (or a multiple of 12 in case of RE) according to the number of PHICH groups. In case of the PDCCH, at least one CCE is used as a basic unit. One CCE is 9 REGs (=36 REs). By using this combination, according to the total number of RBs in a system and the number of OFDM symbols indicated by the PCFICH, an REG used for any one of the RS, the PCFICH, the PHICH, and the PDCCH can be present in the control region. Such an REG is called an unmapped REG.

Assume that the total number Nrb of RBs in the system is 6, 25, 50, and 100, four transmit antennas are used, a normal CP is used, and a PHICH configuration is ⅙ of the total number of RBs. Table 1 shows the number of REs for the RS, the PCFICH, and the PHICH in the control region.

TABLE 1

| | (1) RE based on the number of OFDM symbols | | | | (2) RE for RS | | | | (3) RE for PCFICH | (4) RE for PHICH |
|---|---|---|---|---|---|---|---|---|---|---|
| Nrb | 1 | 2 | 3 | 4 | 1 | 2 | 3 | 4 | 1~4 | 1~4 |
| 6 | | 144 | 216 | 288 | | 48 | 48 | 48 | 16 | 12 |
| 25 | 300 | 600 | 900 | | 100 | 200 | 200 | | 16 | 12 |
| 50 | 600 | 1200 | 1800 | | 200 | 400 | 400 | | 16 | 24 |
| 100 | 1200 | 2400 | 3600 | | 400 | 800 | 800 | | 16 | 36 |

Table 2 shows the number of unmapped REGs based on the number of OFDM symbols for the control region.

TABLE 2

| | Available REs for PDCCH (5) = (2) − (3) − (4) | | | | Available CCEs for PDCCH (6) = floor[(5)/36] | | | | Unmapped REGs (7) = (5) − (6) * 36 | | | |
|---|---|---|---|---|---|---|---|---|---|---|---|---|
| Nrb | 1 | 2 | 3 | 4 | 1 | 2 | 3 | 4 | 1 | 2 | 3 | 4 |
| 6 | | 66 | 140 | 212 | | 1 | 3 | 5 | | 8 | 8 | 8 |
| 25 | 172 | 372 | 672 | | 4 | 10 | 18 | | 7 | 3 | 6 | |
| 50 | 360 | 760 | 1360 | | 10 | 21 | 37 | | 0 | 1 | 7 | |
| 100 | 748 | 1548 | 2748 | | 20 | 43 | 76 | | 7 | 0 | 3 | |

Therefore, when the unmapped REG is present, the unmapped REG can be used for transmission of the E-PCFICH 1020. When the unmapped REG is insufficient, an REG for a CCE usage can be adopted and used.

Figure 11:
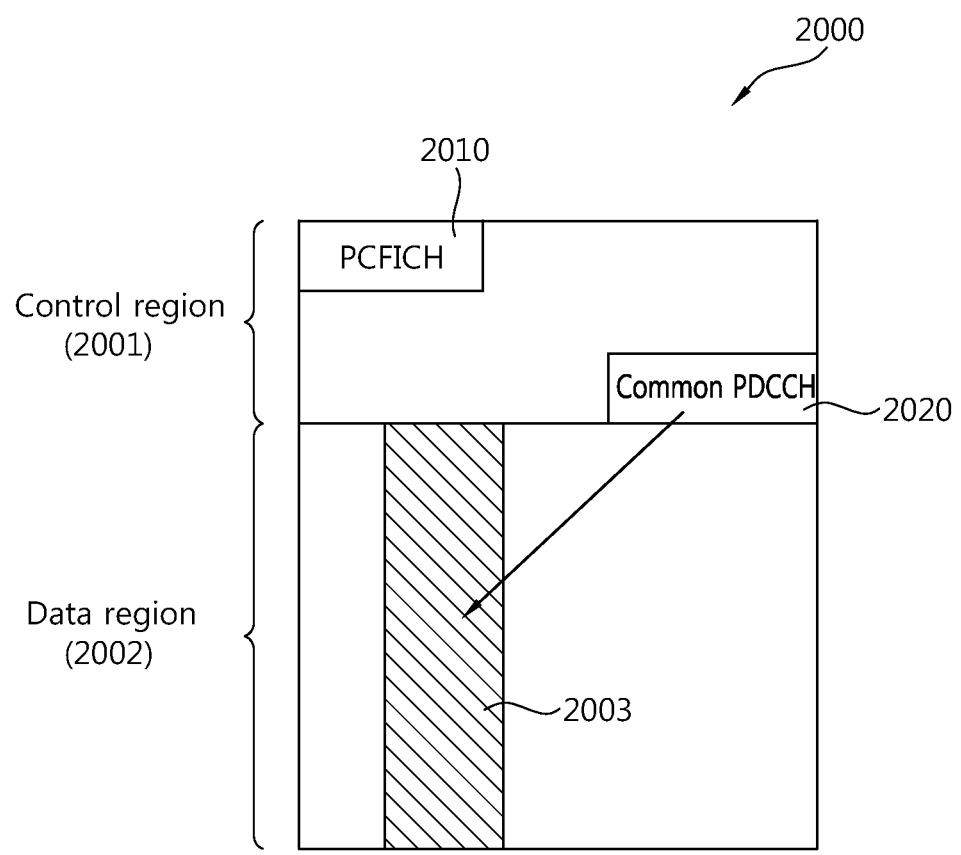
FIG. 11 shows control information transmission according to an embodiment of the present invention.

FIG. 11 shows control information transmission according to an embodiment of the present invention.

A subframe 2000 includes a control region 2001, a data region 2002, and an extended control region 2003. The extended control region 2003 is used to monitor some PDCCHs of the existing data region.

A CFI for reporting a size of the control region 2001 is transmitted through a PCFICH 2010.

A cross-CFI and/or extended control information regarding the extended control region 2003 are transmitted through a common PDCCH 2020.

The common PDCCH 2020 can be transmitted in a predetermined resource without having to use blind decoding. A resource used for the common PDCCH 2020 follows RB allocation of the PDSCH, and can have a predetermined start point and can be allocated in a predetermined density unit. For example, allocation always starts from RB=0, and an increment of the RB size is a multiple of 4. Alternatively, the increment can be a unit less than 1, such as a multiple of ½.

For detection of the E-PCFICH 1020, a dedicated identifier can be used in CRC masking. The extended identifier can be UE specific, or can be UE group specific or cell specific. An identifier such as the existing C-RNTI can be reused as the extended identifier.

Blind decoding can be used in the common PDCCH 202 similarly to the PDCCH. To decrease the number of blind decoding attempts, a search space in which the E-PCFICH 1020 is searched can be limited. It can be limited to a UE-specific search space or a common search space, or a new extended search space can be defined. Alternatively, a start point of the search space of the E-PCFICH 1020 can be fixed. The number of CCE aggregation levels used for detection of the E-PCFICH 1020 can also be limited. A DCI format used in the E-PCFICH 1020 can be predetermined.

Only some parts of the data region can be used for the extended control region, and the remaining parts can be used for data (PDSCH) transmission. When the extended control region is present, the UE receives the PDSCH in the remaining parts other than the extended control region.

Figure 12:
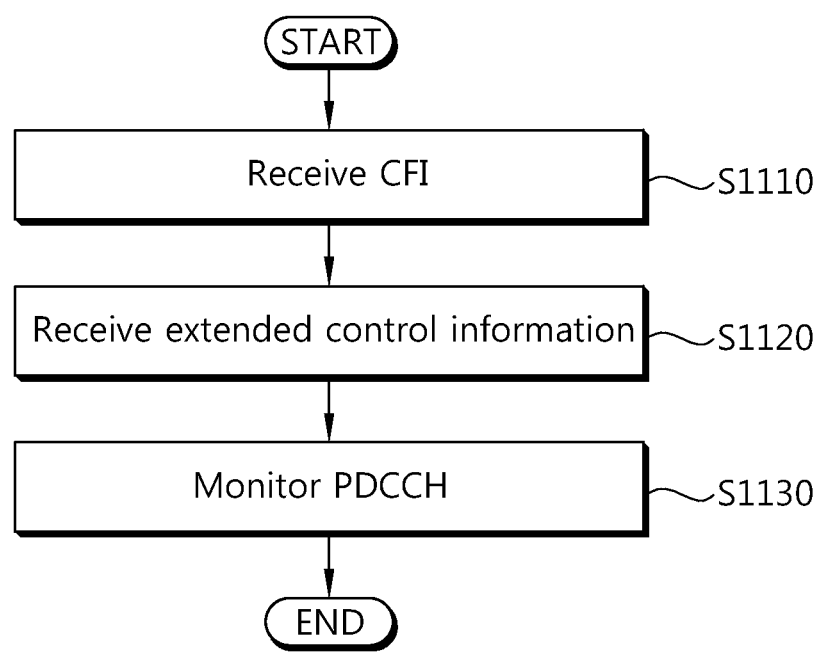
FIG. 12 is a flowchart showing a control channel monitoring method according to an embodiment of the present invention.

FIG. 12 is a flowchart showing a control channel monitoring method according to an embodiment of the present invention.

A UE receives a CFI indicating a size of a control region in a subframe through a PCFICH (step S1110).

The UE receives extended control information regarding an extended control region in the subframe through an E-PCFICH (or common PDCCH) in the control region (step S1120). The UE can receive the extended control information through the E-PCFICH according to the embodiment of FIG. 10 and/or the common PDCCH according to the embodiment of FIG. 11.

The UE monitors a PDCCH in the control region and the extended control region (step S1130).

Figure 13:
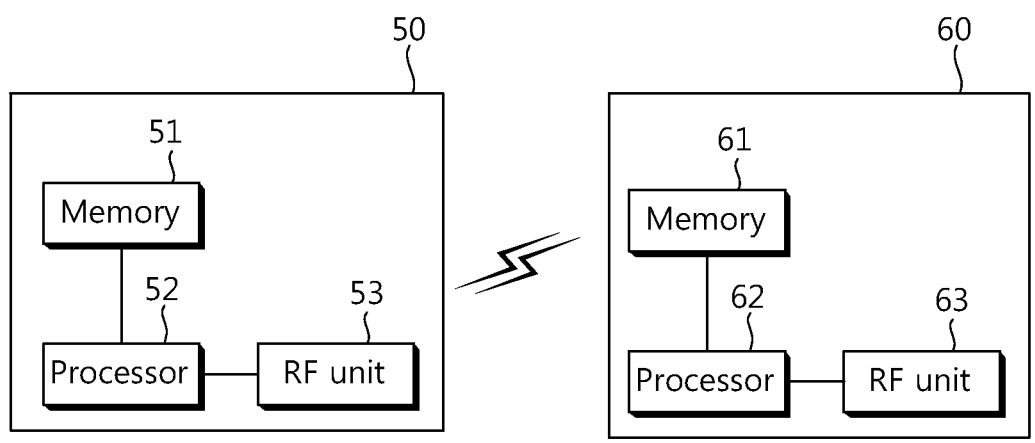
FIG. 13 is a block diagram showing a wireless communication system according to an embodiment of the present invention.

FIG. 13 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. The processor 51 can implement an operation of the BS 50 according to the embodiments of FIG. 10 and FIG. 12.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. The processor 51 can implement an operation of the UE 60 according to the embodiments of FIG. 10 and FIG. 12.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A method for monitoring a control channel in a wireless communication system, the method comprising:

receiving a control format indicator (CFI) on a physical control format indicator channel (PCFICH) in a subframe including a control region and a data region, the CFI on the PCFICH indicating a number of orthogonal frequency division multiplexing (OFDM) symbols for the control region of the subframe, wherein remaining OFDM symbols are used for the data region;

determining whether an extended control region is present in the remaining OFDM symbols used for the data region of the subframe based on whether the CFI on the PCFICH indicates a maximum number of OFDM symbols or not, wherein if the CFI on the PCFICH indicates the maximum number of OFDM symbols used for the control region, the extended control region is determined to be present in the remaining OFDM symbols used for the data region of the subframe; and if the extended control region is determined to be present in the remaining OFDM symbols used for the data region of the subframe, monitoring a physical downlink control channel (PDCCH) in the control region and the extended control region; and receiving extended control information regarding the extended control region in the subframe through a second downlink control channel.

2. The method of claim 1, wherein the extended control information includes resource allocation information regarding a resource to which the extended control region is allocated.

3. The method of claim 1, wherein the extended control information includes a cross-CFI indicating a size of a control region in a subframe of a component carrier.

4. The method of claim 1, wherein the extended control information regarding the extended control region in the subframe is received through the second downlink control channel if the CFI indicates a specific value.

5. The method of claim 1, wherein if the CFI indicates a specific value, it is determined that the extended control region is present in the subframe.

6. The method claim 1, wherein the second downlink control channel is detected by blind decoding.

7. A user equipment configured for monitoring a control channel in a wireless communication system, the user equipment comprising:

a radio frequency (RF) unit configured to transmit and receive a radio signal; and a processor coupled to the RF unit, wherein the processor is configured to:

receive a control format indicator (CFI) on a physical control format indicator channel (PCFICH) in a subframe including a control region and a data region, the CFI on the PCFICH indicating a number of orthogonal frequency division multiplexing (OFDM) symbols for the control region of the subframe, wherein remaining OFDM symbols are used for the data region;

determine whether an extended control region is present in the remaining OFDM symbols used for the data region of the subframe based on whether the CFI on the PCFICH indicates a maximum number of OFDM symbols or not, wherein if the CFI on the PCFICH indicates the maximum number of OFDM symbols used for the control region, the extended control region is determined to be present in the remaining OFDM symbols used for the date region of the subframe; and if the extended control region is determined to be present in the remaining OFDM symbols used for the data region of the subframe, monitor a physical downlink control channel (PDCCH) in the control region and the extended control region, wherein the processor is further configured to receive extended control information regarding the extended control region in the subframe through a second downlink control channel.

8. The user equipment of claim 7, wherein the extended control information includes resource allocation information regarding a resource to which the extended control region is allocated.

9. The user equipment of claim 7, wherein the processor is further configured to receive the extended control information regarding the extended control region in the subframe through the second downlink control channel if the CFI indicates a specific value.

10. The user equipment of claim 7, wherein if the CFI indicates a specific value, the processor is further configured to determine that the extended control region is present in the subframe.

11. The user equipment of claim 7, wherein the extended control information includes a cross-CFI indicating a size of a control region in a subframe of a component carrier.

12. The user equipment of claim 7, wherein the second downlink control channel is detected by blind decoding.

* * * * *